July 15, 1969   D. K. CUMMINGS   3,455,396
AIRCRAFT PROPELLER WITH ELECTRICAL DEICER
Filed Aug. 9, 1967   3 Sheets-Sheet 1

INVENTOR
DALE K. CUMMINGS
BY
Marechal, Biebel, French & Bugg
ATTORNEYS

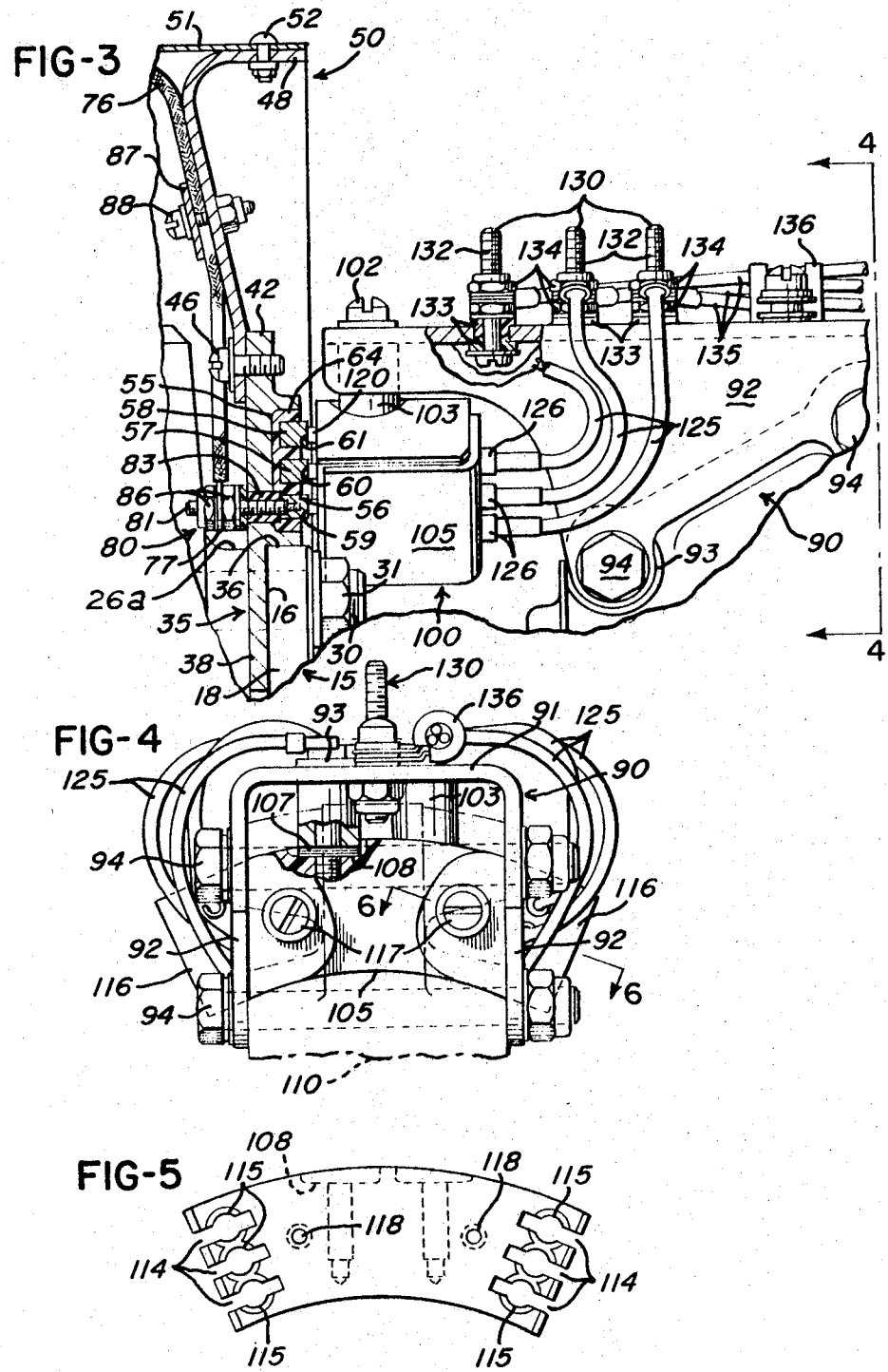

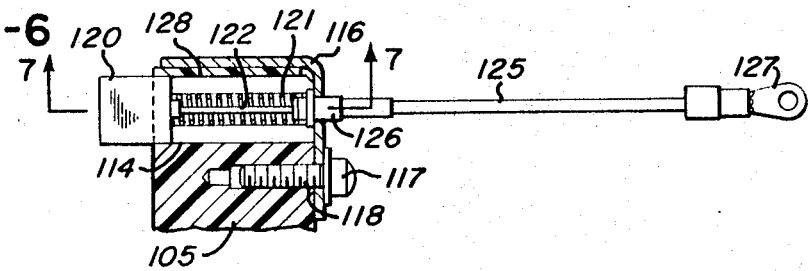
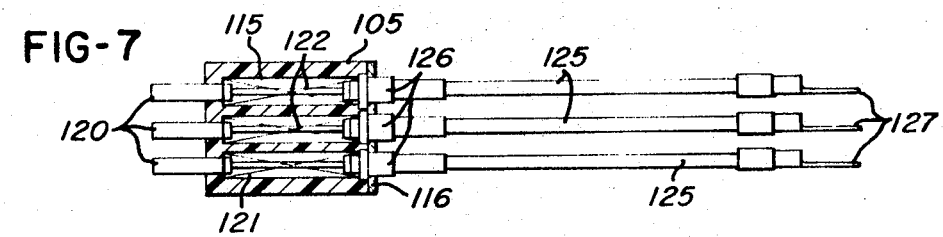
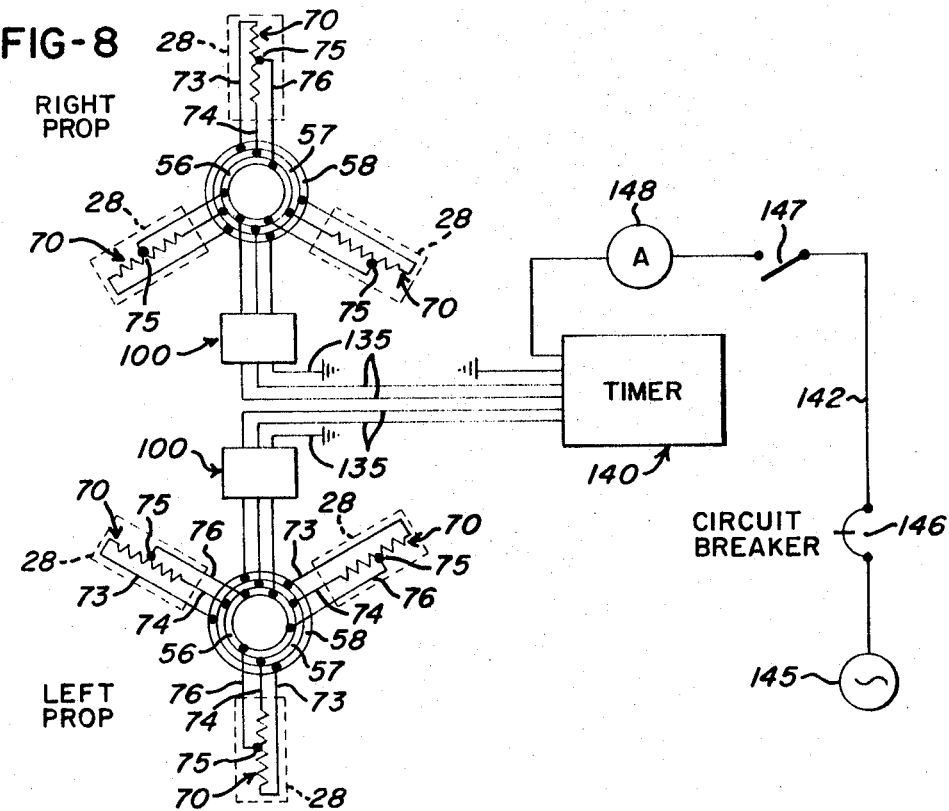

United States Patent Office 3,455,396
Patented July 15, 1969

3,455,396
AIRCRAFT PROPELLER WITH ELECTRICAL DEICER
Dale K. Cummings, Middletown, Ohio, assignor to The Cessna Aircraft Company, Wichita, Kans., a corporation of Kansas
Filed Aug. 9, 1967, Ser. No. 659,349
Int. Cl. B64c 11/16; B64d 15/12
U.S. Cl. 170—160.23                                 6 Claims

ABSTRACT OF THE DISCLOSURE

An aircraft propeller having a hub mounted on an engine drive shaft and secured by bolts extending through a mounting flange projecting from the shaft, blades extending from the hub and each having an electrical deicing heating element, a plurality of concentric slip rings supported by an annular member seated on the propeller mounting flange, and a brush holder assembly mounted on the engine case and having a pair of conveniently replaceable brushes in sliding contact with each ring.

Background of the invention

In two or three blade propellers for certain single, twin or multi-engine aircraft with anti-icing equipment, it is common to mount electrical elements on the inner portion of the leading edge of each blade and to cover them with rubber boots. Leads extend from the heating elements to corresponding slip rings mounted on the propeller hub and are supplied with electrical power through brushes in sliding contact with the slip rings. Usually a timer is provided to control the time sequence when the heating elements of each propeller are energized in accordance with a predetermined cycle so that all of the heating elements are not energized simultaneously to prevent a substantial drain on the electrical power supply of the aircraft.

In some propellers, the slip rings are cylindrical in configuration and are mounted in axially spaced relation on the propeller hub and are in sliding contact with corresponding axially spaced brushes. The slip rings have also been arranged concentrically in a radial plane for sliding contact with correspondingly radially spaced brushes. The concentric slip rings are usually potted within an annular support member which is mounted either on the propeller hub or on an annular sheet metal bulkhead which supports the spinner enclosing the propeller hub.

It has been found that when the slip rings are not perfectly square and are a few thousandths out of square the brushes occasionally bounce on the slip rings, causing a break in the power supply to the heating elements and high wear on the brushes. Thus it has been necessary to machine a precise seat on the propeller hub for mounting the annular support member for the slip rings on the hub or to shim the support member with the aid of dial gages when mounting the support member on the spinner bulkhead, since the bulkhead is not normally constructed and assembled with high precision. Both the machining operation on the hub and the shimming of the slip ring support member on the spinner bulkhead involve substantial time and effort and accordingly, significantly increase the cost of adding an electric deicing system for the propellers of an aircraft.

Summary of the invention

The present invention is directed to an improved construction of a slip ring and brush assembly and the mounting of the slip rings for rotation with the propeller hub and engine shaft. Particularly, the present invention involves the mounting of a plurality of concentric slip rings on an annular support member which is constructed to seat directly on the propeller mounting flange of the drive shaft and thereby run true with respect to the drive shaft. The slip ring support member may have an inwardly projecting flange positioned between the propeller hub and the propeller mounting flange. The slip rings are therefore precisely positioned with their corresponding faces square in relation to the rotational axis of the shaft since it is piloted on true surfaces, such as the forward face and the outer cylindrical surface of the propeller mounting flange, which are precisely machined by the engine manufacturers. As a result, the present invention eliminates the need for machining the propeller hub, or the shimming operation required when the slip ring support is mounted on the spinner bulkhead.

The present invention also provides for mounting the spinner bulkhead on the outer periphery of the slip ring support member. In addition, the present invention provides an improved brush holder assembly which is supported by a bracket mounted directly on the engine case. Specifically, the holder block or body includes a series of parallel spaced slots within the end portions for supporting corresponding brushes which are retained and carried by angle brackets removably mounted on the end portions of the holder body. As a result, the brush holder assembly provides for convenient periodic replacement and inspection of the brushes in addition to an economical and compact construction.

Other features and advantages of the invention will be apparent from the following description, the accompanying drawings and the appended claims.

Brief description of the drawings

FIG. 3 is an enlarged fragmentary vertical section showing the support for the slip rings and showing the brush holder assembly in side elevation;

FIG. 4 is an elevational view looking generally on the line 4—4 of FIG. 3 with the engine case shown in phantom;

FIG. 5 is an elevational view looking at the rear side of the brush holder body;

FIG. 6 is a fragmentary section of the brush holder assembly as taken generally on the line 6—6 of FIG. 4;

FIG. 7 is a section taken generally on the line 7—7 of FIG. 6; and

FIG. 8 is a schematic diagram illustrating the electrical control circuit for a twin propeller deicer system.

Description of the preferred embodiment

Figure 1:
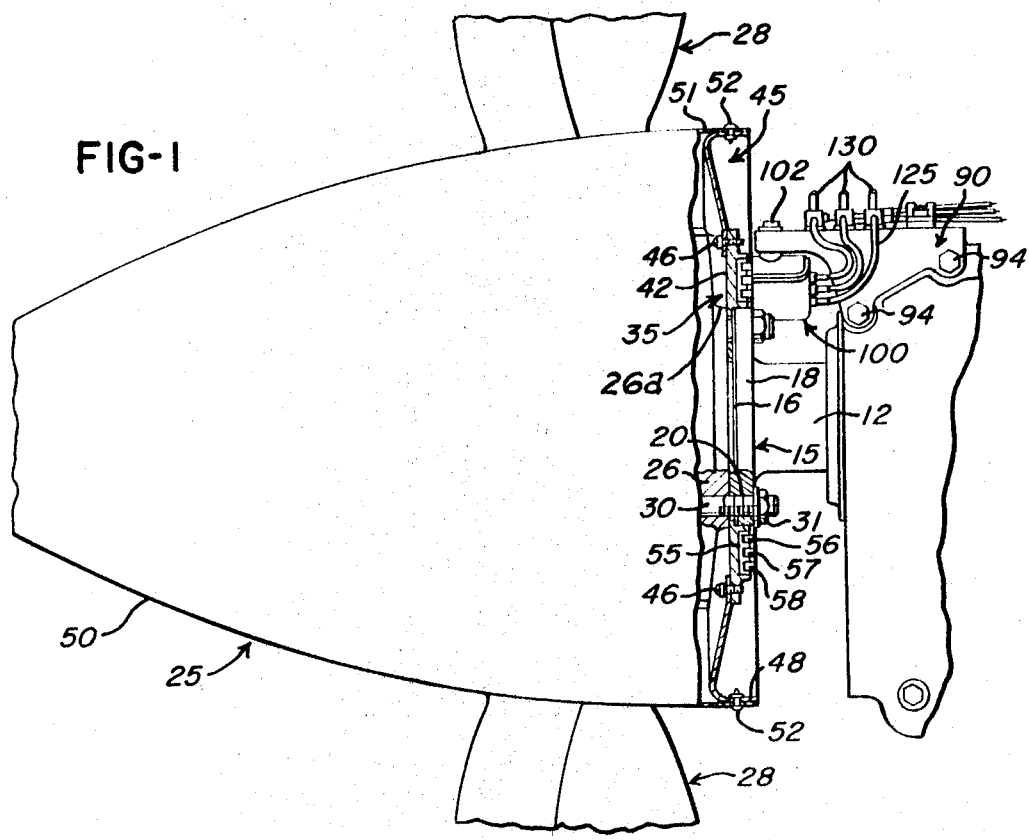
FIG. 1 is a fragmentary view of a propeller mounted on a drive shaft and showing the front portion of an engine case.

Referring to the drawings, FIG. 1 shows an engine case 10 from which projects a drive shaft 12 having an annular propeller mounting flange 15. The flange 15 includes a flat radial face 16 and an outer cylindrical surface 18. A series of holes 20 are formed within the flange 15 and are uniformly spaced on a common circle.

A propeller 25 includes a hub 26 which is mounted on the drive shaft 12 and supports a plurality of two or three propeller blades 28. A series of bolts 30 project rearwardly from the hub 26 through the corresponding flange holes 20 and receive nuts 31 for securing the propeller hub to the mounting flange 15 of the drive shaft 12.

Figure 2:
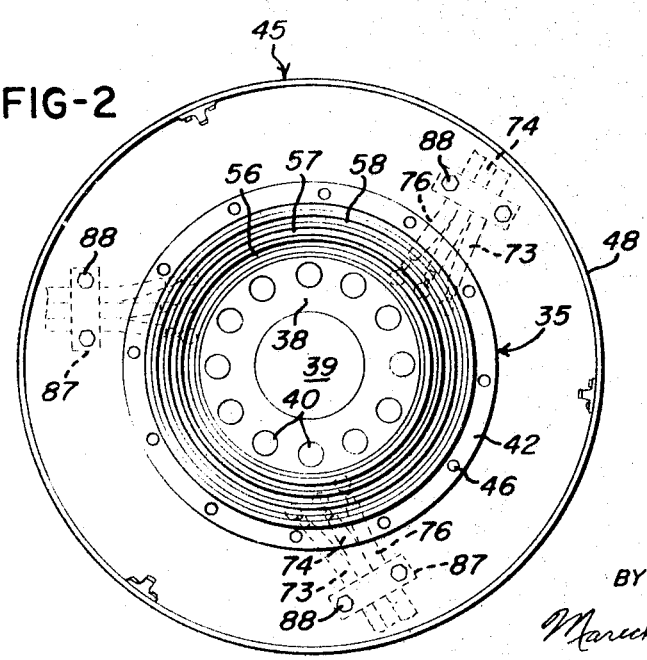
FIG. 2 is an elevational view of the rear side of the spinner bulkhead and support member for the slip rings.

A generally flat annular support member 35 (FIGS. 1 and 3) includes an inner cylindrical surface 36 which seats directly on the outer cylindrical surface 18 of the propeller mounting flange 15. The support member 35 also includes an inwardly projecting flange 38 which is positioned between the propeller hub 26 and the forward face 16 of the propeller mounting flange 15, and has a central opening 39 for receiving the forward end of the shaft 12. The flange 38 also has a series of holes 40 (FIG. 2) for receiving the corresponding bolts 30.

An outwardly projecting flange 42 is formed on the support member 35 and supports the inner periphery of an annular spinner bulkhead 45 which is secured to the flange 42 by a series of circumferentially spaced screws 46. The bulkhead 45 includes an outer cylindrical flange 48 which projects rearwardly in surrounding relationship to the support member 35. A generally dome-shaped spinner 50 covers the hub 26 of the propeller 25 and has a rear cylindrical end portion 51 which is removably secured to the flange 38 by a series of circumferentially spaced screws 52.

Referring to FIGS. 1 and 3, an annular rearwardly-facing cavity 55 is formed in the support member 35 and receives three concentric slip rings 56, 57 and 58 (FIG. 2) having corresponding flat coplanar faces 59, 60 and 61 lying in a radial plane perpendicular to the rotational axis of the shaft 12 and parallel to the face 16 of the propeller mounting flange 15. The slip rings 56–58 are retained within the cavity 55 by a suitable epoxy cement 64 thereby forming which is commonly referred to as a potted assembly.

Referring to FIG. 8, an electrical heating element 70 is mounted on the inner portion of the leading edge of each blade 28 of each propeller 25 of a twin engine aircraft. The outer end of each heating element 70 is connected by a lead 73 to the outer slip ring 58 and the inner end of each heating element 70 is connected by a lead 74 to the center slip ring 57. A center tap 75 is provided on each heating element 70 and it is connected by a lead 76 to the inner slip ring 56.

Referring to FIG. 3, each of the leads 73, 74 and 76 is provided with a connector 77 which is attached to a terminal 80 connected to the corresponding slip ring. Each terminal 80 includes a threaded stud 81 projecting into the corresponding slip ring and supported by an insulated bushing 83 mounted within a hole formed within the support member 35. A pair of nuts 86 are mounted on each stud 81 and secure the corresponding connector 77. A series of clips 87 (FIG. 3) are fastened to the spinner bulkhead 45 by bolts 88 and secure the leads 73, 74 and 76 to the bulkhead.

As shown in FIG. 4, a U-shaped bracket 90 having a web 91 connecting parallel spaced flanges 92, seats on bosses 93 formed on the forward nose of the engine case 10. A pair of bolts 94 extend through aligned holes formed within the flange 92 and bosses 93 and secure the bracket 90 to the engine case. A brush holder assembly 100 is supported by a pair of screws 102 (FIG. 3) which extend downwardly through tubular spacers 103 and are threadably connected to an arcuate shaped brush holder body 105. Shim washers 107 are inserted between the inner ends of the spacers 103 and corresponding counterbores 108 formed on the body 105 for precisely spacing the brush holder assembly 100 in predetermined spaced relation to the rotational axis of the drive shaft 12.

Referring to FIG. 5, a series of three parallel spaced rectangular slots 114 are formed within each end portion of the arcuate-shaped body 105 and each slot is interrupted by a bore 115 having a diameter slightly greater than the thickness of the slot. Referring to FIGS. 6 and 7, an L-shaped bracket 116 is removably mounted on each end portion of the body 105 and is secured by a screw 117 which extends into a threaded hole 118 formd within the body 105. A series of three carbon brushes 120 are connected to each bracket 116 by corresponding springs 121 and flexible wires 122 extending from corresponding insulated leads 125 secured to the bracket 116 by insulator bushings 126. A connector 127 (FIG. 6) is attached to the opposite end of each wire 122.

A flat sheet 128 of rigid insulation material is secured to the bracket 116 on each end portion of the body 105 and retains the corresponding brushes 120 within the corresponding slots 114 with the springs 121 and wires 122 extending within the corresponding bores 115. Thus the three brushes 120 supported within the slots 114 on each end portion of the body 105 can be conveniently removed simply by removing the screws 117 which secures the corresponding angle bracket 116 to the body 105.

Referring to FIG. 3, the spacing between the slots 114 in each end portion of the body 105 corresponds to the radial spacing of the slip rings 56–58 and the body 105 is precisely positioned by the shims 107 so that a pair of brushes 120, one on each end of the body 105, engage each of the corresponding faces 59–61 of the slip rings and thereby assure electrical continuity between the brushes and the corresponding slip rings. Each brush of each pair of brushes 120 are spaced arcuately about 45° apart so that each engages its associated slip ring at 22½° either side of a vertical centerline.

The connectors 127 on the ends of the brush leads 125 are connected to corresponding terminals 130 (FIGS. 3 and 4) each formed by a thread screw 132 supported by a pair of insulated bushings 133 mounted within the hole formed within the web 91 of the bracket 90. Each connector is secured between a pair of nuts 134 which also retain corresponding connectors attached to the ends of the corresponding power supply lines 135 secured to the bracket 90 by a clip 136.

Referring again to the wiring diagram shown in FIG. 8 which illustrates a deicing system for a twin propeller aircraft, one lead 135 from the set of three terminals 130 for each propeller, is connected to ground and the other two leads 135 are connected to a timer 140. Power is supplied to the timer 140 by a line 142 extending from a power source 145 and provided with a circuit breaker 146, a manual control switch 147 and ammeter 148 which are mounted on the instrument panel of the aircraft. The timer 140 energizes the leads 135 and according to a predetermined cycle so that only a portion of the heating elements 70 on the blades of each propeller are energized at any given time to avoid an excessive drain on the electrical power source 145.

From the drawings and the above description, it can be seen that the construction and mounting of the slip rings and brush holder assembly in accordance with the invention, provides several desirable features and advantages. For example, by mounting the slip ring support member 35 on the propeller mounting flange 15 with the radially inwardly projecting flange 38 between the hub 26 and flange 15, and the cylindrical surface 36 seated on the outer surface 18 of the flange 15, the slip rings 56–58 are assured of being concentric with the drive shaft 12, and the corresponding faces 59–61 of the slip rings are assured of lying in a plane which is perfectly square with the rotational axis of the shaft. Thus, no machining is required on the propeller hub 26 and no tedious shimming operation is necessary to assure the concentricity and the squareness of the faces 59–61. As a result, dependable contact is assured between the brushes 120 and the corresponding slip rings.

The specific construction of the brush holder assembly 100 also provides important features. That is, by forming the series of brush retaining slots 114 in each end portion of the arcuate shaped body 105, and by mounting the corresponding brushes 120 on a bracket 116 having the insulating closure sheet 128, the brushes 120 are positively confined during use but may be conveniently and quickly replaced simply by removing the screws 117 and disconnecting the leads 125 from the terminals 130 so that each sub-assembly of the brushes 120, springs 121, leads 125 and bracket 116 can be quickly replaced as a unit. The mounting of the brush holder assembly 100 on the engine case 10 by the rigid support bracket 90 also assures that the brushes 120 will be positively retained in precise spaced relation with the drive shaft 12 after the brush holder body 105 has been properly adjusted with the correct shim washers 107.

The apparatus of the present invention can be used advantageously for either single or multi-engine aircraft, wherever it is desired to supply electric power to electric heating elements mounted on the blades. Further, while a preferred embodiment is shown in which the slip ring member is piloted on the outer cylindrical surface of the propeller flange, it is obvious that other arrangements of piloting this member to the flange may be employed, such as by piloting on the propeller hub dowel pins which are accurately aligned with corresponding dowel pin holes in the engine propeller hub mounting flange. Also, it is within the scope of this invention to pilot the slip ring support member 35 on the rear boss of the propeller hub such as indicated at 26a in FIGS. 1 and 3. However, the arrangement shown herein is preferred in that it makes use of the true face and cylindrical surfaces of the propeller mounting flange to achieve trueness of the slip rings with respect to the rotation axis of the engine crankshaft.

The arrangement of this invention has the particular advantage of permitting the slip rings to be positioned closely to the propeller flange thereby reducing to a substantial degree the diameter of the rings. This arrangement accordingly has the advantage of reducing the surface speed at the brushes, thereby resulting in substantially improved brush and ring life, as compared to prior propeller slip ring assemblies of greater diameters.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In an aircraft propeller assembly including a plurality of blades extending from a central hub, an electrical heating element associated with each said blade for deicing the blade, and an aircraft engine drive shaft having a propeller mounting flange formed with a radial mounting face, the improvement in apparatus for supplying electrical power to such heating elements comprising an annular slip ring support member having an inwardly projecting flange defining a radial face adapted to be seated directly against said propeller mounting flange in the axial space between said mounting flange and such hub, a plurality of concentric slip rings mounted on said support member radially outwardly of said propeller mounting flange with each said ring having a contact face which is true with the rotational axis of the engine shaft as defined by the corresponding trueness of the propeller mounting flange, a contact brush for each said ring, and brush holder means supporting each said bruch for movement adjacent the corresponding said ring including means for urging said brush into sliding engagement with the contact face of a corresponding said ring.

2. An aircraft propeller assembly as defined in claim 1 wherein said propeller mounting flange on said shaft includes a cylindrical outer surface, and said support member includes a cylindrical internal surface adapted for seating on said outer surface of said mounting flange.

3. An aircraft propeller assembly as defined in claim 1 including a hollow spinner covering said hub, an annular bulkhead mounted on the outer periphery of said support member and having a generally cylindrical outer flange, and means for securing said spinner to said outer flange of said bulkhead.

4. An aircraft propeller assembly as defined in claim 1 wherein said holder means includes a body having opposite end portions, means defining a plurality of parallel spaced slots within at least one said end portion of said body with each said slot receiving one of said brushes, a bracket removably mounted on said end portion of said body having said slots, and means connecting said brushes within said slots to said bracket to provide for convenient inspection and replacement of said brushes.

5. In an aircraft propeller assembly including a plurality of blades extending from a hub adapted for mounting on the propeller mounting flange of an engine drive shaft in which such flange is formed with a radially flat face surface and a cylindrical outer surface, and including an electrical heating element mounted on each said blade for deicing the blade, comprising an annular slip ring support member having means defining a cylindrical internal surface adapted for seating directly on said outer surface of said mounting flange and further having an inwardly radial projection positioned between said hub and said flange and proportioned to mate flat against said flange face surface, means mounting a plurality of slip rings in concentric relation on said support member radially outwardly of said propeller mounting flange, each said ring having an exposed face lying in a plane true with the rotational axis of said engine drive shaft, means connecting said slip rings to said propeller blade heating elements, an electrical contact brush for each said ring, and brush holder means supporting each said brush in electrical sliding engagement with a corresponding said ring.

6. In an aircraft propeller assembly including a plurality of blades extending from a hub adapted for mounting on the propeller mounting flange of an engine drive shaft, and including an electrical heating element mounted on each said blade for deicing the blade, improved apparatus for supplying electrical power to said heating elements, comprising an annular support member, a plurality of concentric slip rings each having a generally radial face, means for mounting said rings on said support member, means for connecting said support member directly to said shaft to provide for rotation of each said ring face in a plane perpendicular to said axis, a brush holder including a body adapted for mounting on such engine and extending transversely and having opposite end portions, means defining a plurality of parallel spaced slots within each said end portion of said holder, a brush mounted within each said slot, and bracket means removably mounted on each said end portion of said holder and connected to the corresponding said brushes to provide for convenient replacement of said brushes.

References Cited
UNITED STATES PATENTS

| | | |
|---|---|---|
| 2,473,147 | 6/1949 | Jensen. |
| 2,820,958 | 1/1958 | Fraser. |
| 3,020,386 | 2/1962 | Naxon. |

EVERETTE A. POWELL, Jr., Primary Examiner

U.S. Cl. X.R.

170—159